Patented Nov. 22, 1932

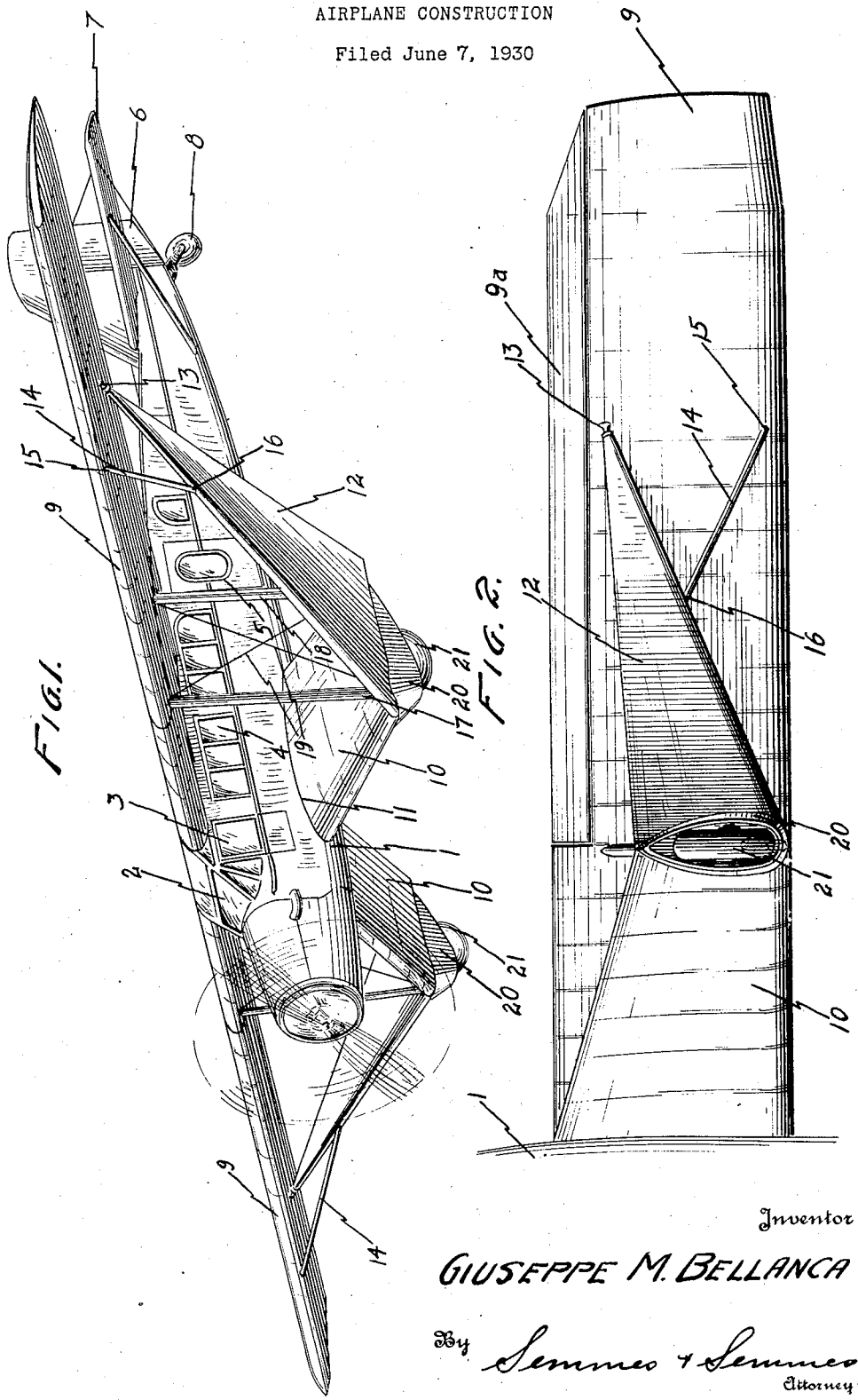

1,888,902

UNITED STATES PATENT OFFICE

GIUSEPPE M. BELLANCA, OF NEW CASTLE, DELAWARE

AIRPLANE CONSTRUCTION

Application filed June 7, 1930. Serial No. 459,746.

This invention relates in general to airplanes and more particularly has reference to a combination wing strut and landing gear.

In the past it has been customary to provide airplanes with landing wheels or other landing members for their support while at rest and while landing and taking off. These wings or other supporting members have been mounted on the airplane by means of rigid strut and tie members properly anchored and braced with respect to the body of the airplane. Obviously, these mounting members have added considerable weight and air resistance to air plane structures in the past although the air resistance has in part been eliminated by stream lining.

It has also been customary to provide angularly arranged struts to support the outer portions of the wings from the body of the airplane. Like the frames which have been used for supporting the landing gear, these strut members have also added weight and air resistance to the airplane. Also, as in the case of landing gear the air resistance has been partially eliminated by stream lining parts. However, so far as I am aware, the landing structures and wing supporting parts have in the past served no useful purpose but have only been a source of dead weight while the plane was in the air. It is therefore quite evident that any such structures which might be provided and which would serve some useful purpose at all times would be highly desirable.

To overcome the above and other disadvantages of prior construction in landing gears and wing supporting parts is one of the objects of this invention.

Another object of this invention is to provide a landing gear at least a part of which will serve a useful purpose while the plane is in the air.

Another object of this invention is to provide a landing gear, parts of which will serve to help sustain the weight of the plane while it is in the air.

Another object of this invention is to provide a framework for supporting the main wing of an airplane, which framework will assist in the operation of the plane.

Another object of this invention is to provide a combination landing gear frame and wing supporting structure.

Yet another object of this invention is to provide an airplane in which three airfoils are arranged in planes angularly disposed with respect to each other.

Still another object of this invention is to provide a combination landing gear and wing-supporting structure which will transmit a part of the landing force directly to the wing of the airplane.

Yet another object of this invention is to provide a combination landing gear and wing-supporting structure which will offer the least possible air resistance and which will assist in sustaining the plane in its flight.

To accomplish the above and other important objects this invention comprehends a means whereby the landing members are attached to the airplane and whereby the wing is very rigidly supported.

To insure adequate comprehension of the invention and wishing it to be distinctly understood that various modifications may be made in the preferred embodiments herein shown and described without departing from the spirit and scope of the invention, reference is made to the accompanying drawing in which similar numerals indicate corresponding parts.

Figure 1 is a perspective view of an airplane of the cabin monoplane type showing the improved landing gear and wing support attached thereto.

Figure 2 is a plan view of the inverted right wing of the airplane shown in Figure 1.

Referring now more particularly to the drawing there is shown in Figure 1 an airplane having a fuselage 1 in which are provided a pilot's cabin 2 having a door 3 and a passengers' cabin 4 having a door 5. At the rear of the fuselage the conventional rudder structure 6 and elevator structure 7 are provided. There is also provided the conventional tail-supporting landing wheel 8.

Just to the rear of the pilot's cabin 2 there extends across the top of the fuselage the single wing or airfoil 9, which is of the conventional design. In the trailing edge of this airfoil is provided the usual aileron 9a. As a supporting means for the outer part of this wing structure there is provided, instead of the usual outwardly extending struts, a framework which is also utilized for the support of the landing members.

At 10 is illustrated a strut or stub wing which is attached to the lower portion of the fuselage as at 11. This stub wing is formed of such a cross section that when the airplane is in motion it will assist the main wing 9 in sustaining the weight of the plane.

Attached to the lower surface of the wing adjacent its trailing edge as at 13 there is provided a triangular strut member 12 which is also formed to act as a sustaining or lifting surface. To the forward edge of the member 12 a short distance below the wing is attached the member 14 as at the point 16. The upper end of this member is secured to the lower surface of the wing 9 adjacent its leading edge. From the points of its attachment to the wing the member 12 is arranged so that it extends downwardly and inwardly to a point where it intersects and is attached to stub wing 10. From the line of this intersection and attachment of the strut-wing members 10 and 12 with each other, there are provided substantially vertical strut members 17 and 18 extending upwardly to the lower surface of the wing 9 to which they are secured. As a means of reinforcement this structure is braced with a pair of diagonally extending tension members 19.

At the bottom of this frame structure and at the point of intersection of the members 10 and 12 there is provided a fairing 20 for enclosing and stream lining the major part of a landing wheel 21. This landing wheel member may be mounted upon the framework in any desired manner.

The operation of the improved landing gear and wing supporting frame is very advantageous. First of all it will be noted that a substantial number of the parts are sustentation members and will assist the main wing 9 in supporting the weight of the airplane.

Regarding the operation of the structure as a wing supporting mechanism, it will be seen that the members 12 and 14 taken with the braces 17, 18 and 19, and the wing 9 form a triangular truss on the lower side of the wing. To the lower corner of this triangular truss there is attached the strut member 10 which is in turn attached at its other end to the lower portion of the fuselage. It will thus be seen that a very strong and rigid support has been provided for the outer portions of the sustaining wing.

Regarding the operation of this structure as a landing gear, it will be noted that it exposes a minimum of surface to the air and hence minimizes parasitic resistance. Upon landing the thrust from the wheels 21 will be divided into three parts. Any transverse thrusts which might be impressed upon the landing wheels would be taken respectively by the members 10 and 12 and transferred to the fuselage directly or to the fuselage through the wing 9. All vertical thrusts due to landing will be taken directly by the strut members 17 and 18. All tendencies of the wheel to be pushed backward with respect to the airplane will be taken by the rigid strut 10, by the triangular strut 12 through its point of contact 15 with the wing 9 adjacent its trailing edge, and by the tension members 19. Since by its very nature my framework structure is a rigid one, each part will serve as a reinforcement for each other part and the likelihood of overstraining will be clearly reduced.

From the foregoing it will appear that there has been provided a landing gear and wing supporting structure which offers a minimum of air resistance and a maximum of strength.

It will also appear that there has been provided a structure of the type described which will not merely be dead weight when the airplane is in the air, but which will assist the wings of the airplane in their supporting function.

It is to be noted that this apparatus is not limited in its use to airplanes of the monoplane type or to airplanes of the cabin type, but may be employed on other types of airplanes as well with only slight modifications. It is further to be noted that the sustaining surfaces which are furnished by the members 10 and 12 not only assist in sustaining the weight of the airplane, but because of their sloping disposition, they tend also to stabilize the motion of the airplane.

It is also worthy of note that although this improved device has been illustrated as a supporting structure for landing wheels, it is likewise within the scope of the invention to provide instead of the wheels illustrated any other form of landing members, such as pontoons.

It will be appreciated as above pointed out that various modifications may be made in the apparatus herein disclosed and described without exceeding the scope of the invention as defined in the appended claims it being distinctly understood that the prior art and the claims alone are to be definitive of the invention.

I claim:

1. A combination landing gear frame and wing brace comprising an airfoil strut member attached to the lower part of the fuselage and sloping outwardly, a second airfoil strut member attached to the wing and sloping inwardly and being attached to said first mentioned member, a strut member attached to said first two members at their intersection and extending substantially vertically to the wing, and a landing member attached to the framework at the point of intersection of the three members.

2. In an airplane a fuselage, a main wing, stub wings, air foils connecting the stub wings and the main wing, and landing wheels mounted between the stub wings and the air foils.

3. In an airplane, a fuselage, a main top wing mounted thereon, lower stub wings, triangularly formed lift struts connecting the outer extremities of the stub wings to the outer side of the main wing, and landing wheels mounted between the stub wings and the struts.

4. In an airplane, a fuselage, a main top wing mounted thereon, lower stub wings angularly disposed with respect to the main wing, triangularly formed lift struts angularly positioned with respect to the vertical, connecting the outer extremities of the stub wings to the underside of the main wing, and landing wheels mounted between the stub wings and the struts.

5. In an airplane, a fuselage, a main top wing, lower stub wings, lift struts connecting the outer extremities of the stub wings to the underside of the main wing, and faired landing wheels mounted between the outer extremities of the stub wings and struts.

6. In an airplane, a fuselage, a main top wing mounted thereon, lower stub wings, lift struts connecting the outer extremities of the stub wings to the underside of the main wing, landing wheels mounted between the stub wings and the lift struts, and vertically arranged streamlined struts connected between the underside of the main wing and the stub wings and the lift struts.

7. In an airplane, a fuselage, a top main wing mounted thereon, lower stub wings, lift struts connecting the outer extremities of the stub wings to the underside of the main wing, faired landing wheels independently mounted between the stub wings and the lift struts, and streamlined struts for spacing the outer extremities of the stub wings and lift struts from the underside of the main wing.

In testimony whereof I affix my signature.

GIUSEPPE M. BELLANCA.